Feb. 24, 1959 P. M. NICHOLS 2,874,746
COLORED SIDEWALL TIRES
Filed June 9, 1955 3 Sheets-Sheet 1

INVENTOR.
PARKS M. NICHOLS
BY James J. Long
AGENT

Feb. 24, 1959 P. M. NICHOLS 2,874,746
COLORED SIDEWALL TIRES
Filed June 9, 1955 3 Sheets-Sheet 2
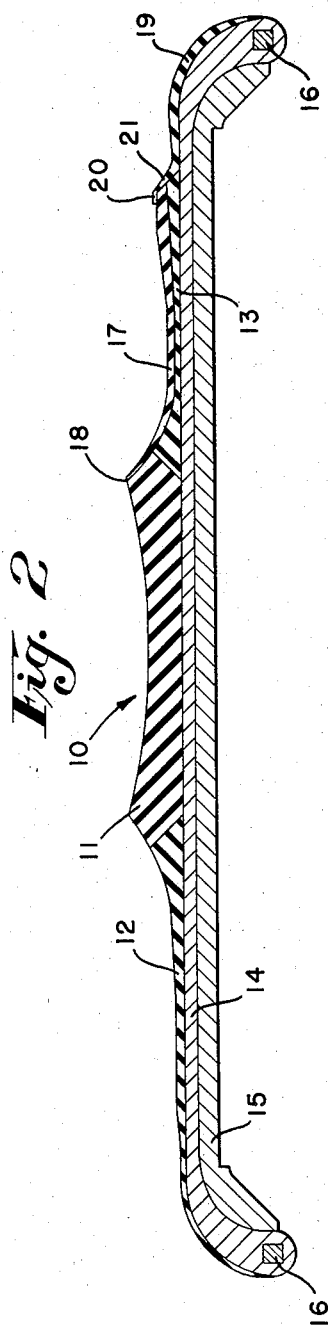
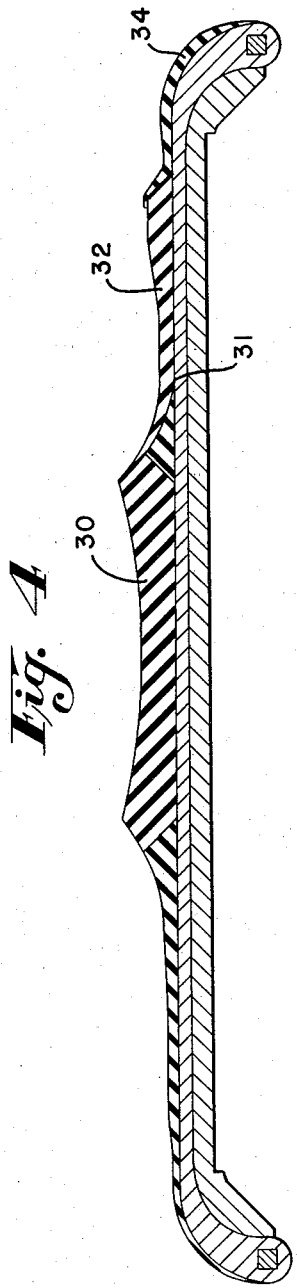
INVENTOR.
PARKS M. NICHOLS
BY James J. Ling
AGENT

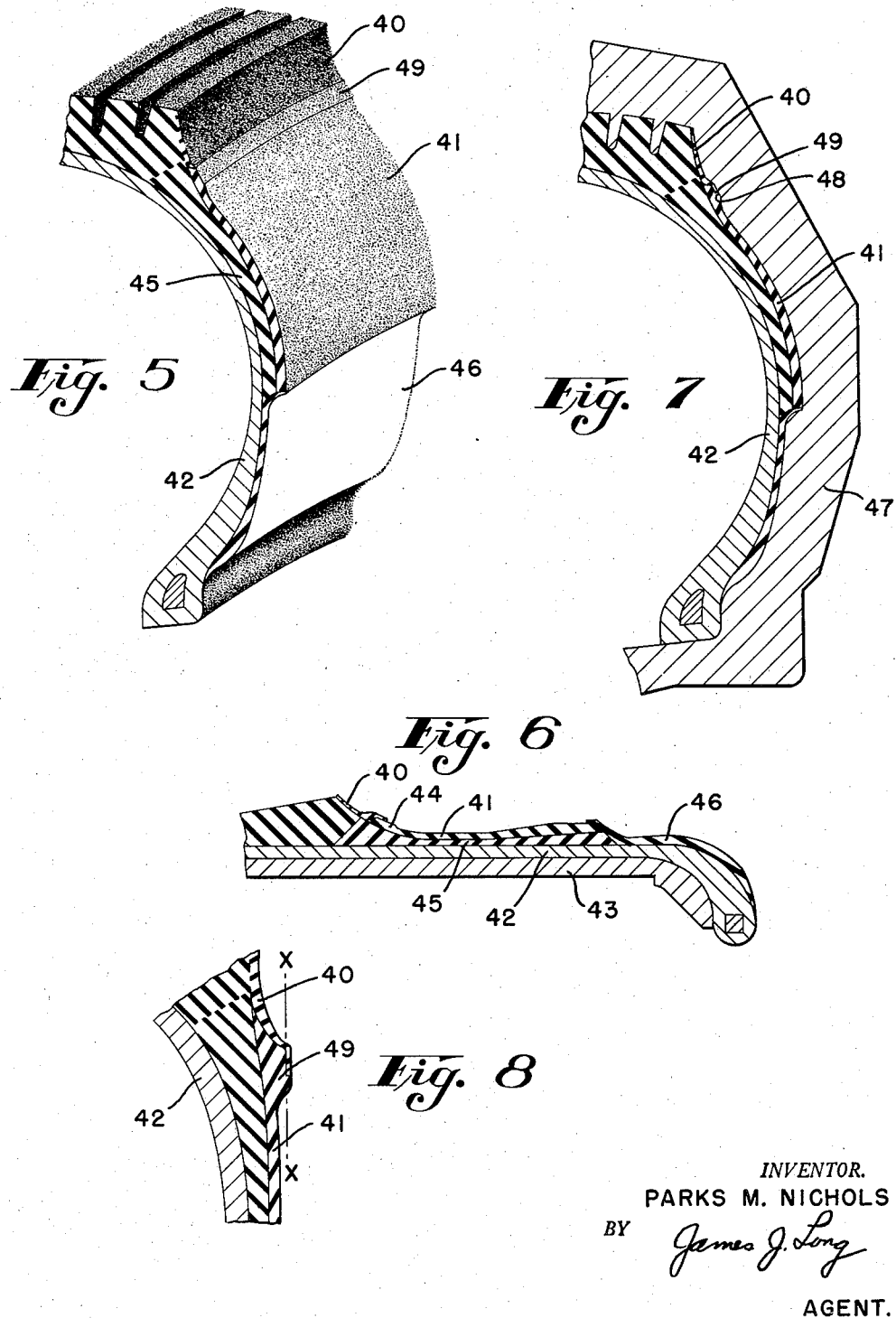

United States Patent Office

2,874,746
Patented Feb. 24, 1959

2,874,746

COLORED SIDEWALL TIRES

Parks M. Nichols, Detroit, Mich., assignor to United States Rubber Company, New York, N. Y., a corporation of New Jersey Application June 9, 1955, Serial No. 514,151

8 Claims. (Cl. 152—353)

This invention relates to pneumatic tires and more particularly it relates to an improved colored pneumatic tire as well as a method of making the same.

A principal object of the invention is to provide a colored pneumatic tire having colored portions incorporated in the structure of the tire in an improved manner.

Another object is the provision of a colored pneumatic tire that is capable of improved tread wear compared to previously known colored tires.

Still another object is to provide a method of making a tire in which a colored sidewall portion substantially devoid of carbon black is combined with a long-wearing tread portion reinforced with carbon black.

A further object of the invention is the provision of a pneumatic tire comprising carbon black reinforced rubber stocks so located in various portions of the tire as to impart excellent mechanical and performance qualities, in combination with a colored portion superimposed on the carbon black containing portions in such manner as not to impair the mechanical and performance qualities.

Still a further object is to provide a tire having a colored sidewall so compounded and applied to the tire as to be resistant to separation and cracking or checking.

The manner in which the invention realizes the foregoing objects, as well as additional objects and advantages, will be made manifest in the following detailed description, which is intended to be read with reference to the accompanying drawings, wherein:

Fig. 2 is a transverse sectional view of a raw tire as assembled in band form on a tire building drum in accordance with one method of practicing the invention;

Fig. 4 is a view similar to Fig. 2, showing the modification of Fig. 3 in process of construction;

Fig. 5 is a fragmentary perspective view of a pneumatic tire showing another modified form of the invention;

Fig. 6 is a fragmentary view similar to Fig. 2 showing the modification of Fig. 5 in process of construction;

Fig. 7 is a partial sectional view of the tire shown in Fig. 5 in a vulcanizing mold; and Fig. 8 is a fragmentary sectional view of the tire shown in Fig. 5 as removed from the mold but before the trim rib has been removed.

Figure 1:
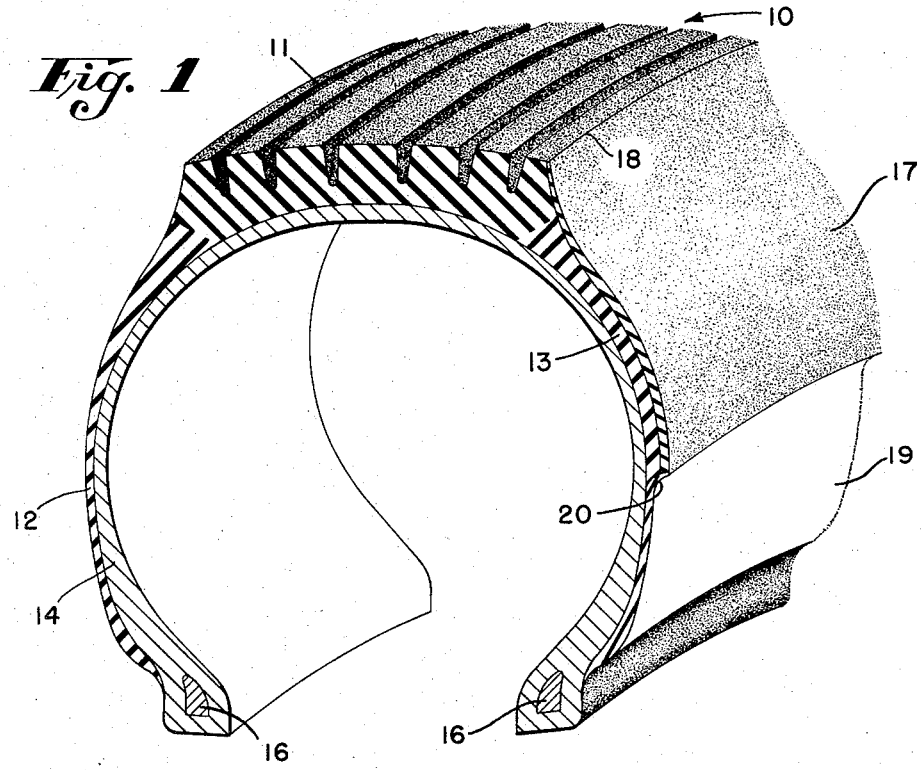
Fig. 1 is a fragmentary perspective view of a pneumatic tire of the invention.

In the past, successful pneumatic tires have almost invariably in commercial practice been made exclusively black, with the exception of a limited white or bright colored zone located on the lower portion of the sidewall. Some attempts have been made previously to make colored tires, but such tires have never achieved commercial importance or wide public acceptance and the serviceability of such tires was inferior to standard black tires.

In my invention, I have taken an entirely new approach to the problem of the colored tire, and in particular my method involves compounding the tread of the tire with carbon black to provide serviceability and resistance to abrasive wear in the road-contacting portion, while applying a colored portion as a covering on the sidewall of the tire extending over the side of the tread. In this way, I avoid the rapid tread wear and other undesirable qualities characteristic of pneumatic tires made of non-black rubber stocks, while still providing, in a preferred aspect of the invention, a tire that in use gives substantially the appearance of a tire made entirely of the colored rubber stock.

Referring to the drawings, and in particular to Fig. 2, in a preferred practice of the invention I first extrude a tread strip 10, made of raw vulcanizable carbon black reinforced rubber stock, with a thickened central portion 11 suitably shaped to constitute the principal road-contacting portion of the tread, and with integral laterally extending thinner more or less tapered side portions 12 and 13 intended to overlie the sides of the tire. The tread strip 10 is superimposed on the upper surface of a previously assembled tire carcass 14 prepared in band form from a plurality of plies of rubberized tire fabric on the usual collapsible tire building drum 15. The carcass 14 has the usual inextensible bead assemblies 16 incorporated at each lateral edge, and the tread strip is so disposed as to center the central thick road-contacting portion 11 with respect to the carcass.

One side portion 12 of the tread strip extends all the way to one bead or toe area of the tire, and this side of the tire is intended to be the rear side, that is, the side of the tire facing toward the vehicle as the tire is ordinarily mounted. The other side portion 13 of the tread strip, constituting the front side of the tire, is shorter and terminates part way down the side of the tire at approximately a point at which a sidewall zone is intended to begin. Such shorter side portion 13 is preferably gradually thickened somewhat toward its lower end with the purpose in mind of providing a construction favorable to protecting the white zone from scuffing, as will be made clear below.

I then form by extrusion or other suitable procedure a relatively thin veneer layer 17 of non-black colored rubber stock, which is superimposed on the front lateral portion 13 of the tread strip, starting at a point 18 on the edge of the road-contacting portion 11 of the tread, and extending to the area of the commencement of the white sidewall zone. The colored veneer strip is made extremely thin toward the end adjacent to the tread edge 18, and the veneer strip is gradually thickened toward the end extending to the white zone, preferably achieving near such zone a thickness of at least 0.1 inch. If desired, the colored veneer strip may be applied from a calender directly to the proper portion of the tread strip prior to placing the tread strip on the carcass.

In the last stage of assembly of the tire illustrated, a suitably formed strip 19 of white sidewall rubber stock is disposed on the portion of the carcass below the termination of the tread strip extension 13 and the colored veneer 17. The upper marginal area 20 of the white sidewall extends across the end faces of the colored veneer 17 and tread strip portion 13, and a thin terminal end portion 21 of the white stock overlaps slightly the outer edge surface of the veneer strip.

After assembling the tire casing in band form on the building drum as described, it may be shaped and cured in toroidal form in a vulcanizing mold in accordance with conventional practice. After the cured tire is removed from the mold the overlapped portion 21 of white stock is buffed off, to present a uniform line of demarcation between the white zone and the upper colored sidewall, as indicated in Fig. 1. The entire outer surface of the upper colored sidewall is then carefully buffed slightly to remove the glazed surface it tends to acquire in the mold and to make the surface clean and fresh and to impart a pleasing velvet texture thereto.

The tire so constructed has a smoothly curved generally S-shaped sidewall contour that is free from sudden raised or depressed portions over the entire surface of the upper colored area 17 of the sidewall. The colored portion extends in a gradual, smooth uninterrupted S-curve from the edge of the tread downwardly to a point of termination located below the horizontal midplane of the tire cross-section. The absence of radial buttress projections or circumferential or relief embellishments of any similar kind avoids the possibility of black stock striking through the colored veneer, due to flow of stock in the mold, and it also facilitates the final buffing of the entire surface to take the glaze off the colored area.

Figure 3:
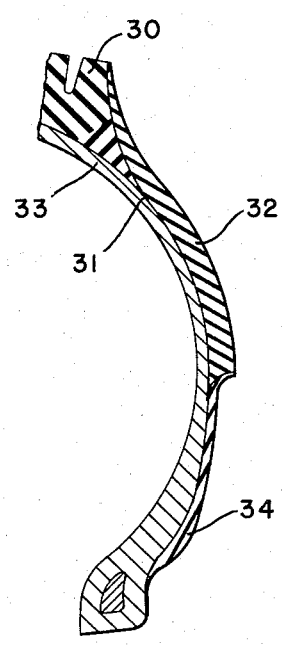
Fig. 3 is a fragmentary cross-sectional view of a modified tire of the invention.

In the modification of the invention shown in Figs. 3 and 4, I proceed similarly, except that I provide a tread strip 30 which does not extend down the front side of the tire, but terminates at an edge 31 just below the shoulder region, corresponding to the lower edge of the principal road-contacting body of the tread. There is then applied a strip 32 of colored sidewall stock which extends at one end to the upper lateral edge of the tread and overlaps the side of the road-contacting portion of the tread as before. The remainder of the colored sidewall strip is thickened, and the strip is in general heavy enough to constitute the entire thickness of the sidewall, being in direct contact with the underlying surface of the carcass 33. A white sidewall strip 34 is also applied as before, and subsequent operations are otherwise the same.

In compounding the tread stock I employ carbon black as a reinforcing pigment to achieve the desired toughness and low rate of abrasive wear. The carbon black may be of any of the conventional kinds, in a non-staining grade, and it is employed in conventional amounts. In general, I avoid the use of staining materials which, if present in appreciable amount, would bleed or diffuse out of the tread stock and cause discoloration of the colored sidewall adjacent thereto, especially in the case of the lighter colors. Thus, I select for the tread stock an antioxidant which does not form highly colored products on exposure to light, such as that known as Polygard, which is a trade preparation believed to be a mixture of alkylated aryl phosphites, or Wingstay, which is a trade preparation believed to be a styrenated phenol. Other suitable non-staining antioxidants include the cresol sulfide types and the aryl phosphite types. These non-discoloring antioxidants are distinguished from the staining types, such as the aromatic amine type, which are unsuitable.

The rubber of the tread stock is preferably GR-S (butadiene:styrene rubbery copolymer) because, among other things, the GR-S stocks made with non-staining antioxidants are more satisfactory than natural rubber stocks, which generally require a staining type of antioxidant for best aging. Butyl rubber (isobutylene:isoprene copolymer rubber) and neophene (polychloroprene) are also preferred over natural rubber for the center tread because of the desirability of avoiding the staining antioxidants which are necessary in natural rubber stocks.

I also prefer to employ in the center tread stocks an accelerator which will not lead to the production of colored products, although the use of a non-staining accelerator is less important, since the amount used is relatively small. It may be mentioned that mercaptobenzothiazole, benzothiazyl disulfide, 2-mercaptothiazoline, di-orthotolylguanidine and diphenyl guanidine are sufficiently non-staining accelerators for the present purpose. By contrast, accelerators likely to lead to discoloration are the butyraldehyde-aniline condensation product and the butyraldehyde-monobutylamine condensation product.

Similarly, the softener or plasticizer used in the center tread stock should be a non-discoloring material, such as a refined petroleum oil or process oil, in place of materials, such as pine tar, and oils derived from coal tar, and the like, which are staining.

The colored sidewall stock should of course also be compounded with the foregoing non-staining considerations in mind and in this connection there arises a particular difficulty in that conventional sidewall stocks do not have sufficient resistance to cracking or checking unless certain protective anti-checking substances are added. However, the anti-checking protective chemicals are highly staining and cannot be used in the present colored sidewalls. I solve this difficulty by selecting for the rubber of the colored sidewall an elastomer which is highly resistant to oxidation. Polychloroprene rubber is particularly suitable for this purpose, and I especially prefer to use mixtures of at least 40 parts or more of polychloroprene with correspondingly 60 parts or less of Hevea rubber. In such mixtures GR-S may be substituted for some or all of the Hevea rubber. Butyl rubber, brominated Butyl rubber, and chlorosulfonated polyethylene elastomer may be mentioned as other oxidation-resistant rubbers suitable for use in the colored sidewall composition. Colored sidewall stocks based on such elastomers are unusually serviceable from the standpoint of checking and cracking, as well as in other respects, even in the absence of the usual discoloring protective chemicals necessary in conventional sidewall compositions.

The carcass stock of the present tire is suitably a conventional carbon-black reinforced stock based on Hevea rubber or mixtures of Hevea with GR-S, compounded so as to be essentially free of undesirable staining materials, as described. Examples of some stocks suitable for use in the invention are as follows (all parts being expressed by weight):

*Example 1*

The following stock is suitable for the tread portion proper, that is, for the central portion of the tread strip constituting the main road-contacting body of the tread:

| | |
|---|---|
| Non-staining GR-S 1503 | 100 |
| Carbon black (non-staining type) | 48 |
| Stearic acid | 1 |
| Non-staining plasticizer | 6 |
| Zinc oxide | 3 |
| Mercaptobenzothiazole | 0.6 |
| Diphenyl guanidine | 0.15 |
| Sulfur | 1.75 |

*Example 2*

The following is a suitable black sidewall stock for use under the colored veneer stock, that is, this stock may be used for the lateral extension of the tread strip which extends under the sidewall veneer. It will be understood that the tread strip may be extruded as a single unit comprised of stock of Example 1 and the following stock in proper operative relation, by means of the conventional dual extruder which is capable of simultaneously extruding and uniting in the desired shape two different kinds of rubber stock.

| | |
|---|---|
| Hevea rubber | 20 |
| Non-staining GR-S 1503 | 80 |
| Carbon black (non-staining type) | 37 |
| Stearic acid | 2 |
| Non-staining plasticizer | 6 |
| Zinc oxide | 3 |
| Anti-check wax | 2.5 |
| Mercaptobenzothiazole | 0.8 |
| Diphenyl guanidine | 0.3 |
| Sulfur | 2 |

Example 3

The following is an example of a suitable colored sidewall stock.

| | |
|---|---|
| Pale crepe | 60 |
| Neoprene W | 40 |
| Titanium dioxide | 15 |
| Zinc oxide | 10 |
| Stearic acid | 0.5 |
| Anti-check wax | 4 |
| Mercaptobenzothiazole | 0.35 |
| Diphenyl guanidine | 0.50 |
| Sulphur | 2 |
| Color | As required |

The colors employed may be any suitable non-fading organic or inorganic pigments. Thus, a brown color may be produced by a mixture of red iron oxide and yellow iron oxide. Blue sidewalls may be produced with the commercial organic pigment known as du Pont Blue GD. These, and similar non-bleeding or non-migratory colors, may be used in any suitable combination or desired amount to produce a particular effect. The colored portion instead of constituting only the upper portion of the sidewall as shown, may cover the entire side of the tire, or different zones of the tire may be differently colored to harmonize or contrast with each other or with the color of the vehicle.

It is desired to emphasize that the invention as described is particularly advantageous with respect to the manner in which the colored sidewall is applied over the side or buttress region of the durable carbon black reinforced tread. There is thus afforded a large area of surface contact between the colored stock and the black stock so that these parts adhere to each other with unusual firmness after vulcanization. The importance of this feature will be appreciated when it is realized that the black tread stock and the colored sidewall stock are basically different kinds of rubber stocks which are ordinarily difficult to attach to each other with sufficient firmness to resist separation under severe conditions of flexure and strain. In this same respect, the absence of any circumferential edge or butt splice between the tread stock and the colored sidewall stock is a particularly advantageous feature, since a splice of this kind would be comparatively weak and liable to lead to a circumferential separation under the severe conditions encountered in tire service.

Another preferred advantageous aspect of the invention lies in the fact that the bulk of the stock located at and below the lateral edge of the tread, that is, the buttress stock, is, like the tread itself a carbon black reinforced stock that is tough and durable. The adhesion of the tread to the stock in the buttress area and to ahe carcass stock, and the adhesion of these stocks to the underlying black portion of the sidewall, is in all cases a firm, permanent adhesion because these are all carbon black reinforced stocks of comparable chemical and physical properties, thus making for a strong, unitary tire structure. This is particularly important in the buttress region, which is a critical zone of the tire from the standpoint of likelihood of circumferential separation, because of the extreme flexing and strain which occur here. By having the bulk of the stock in the buttress region composed of carbon black reinforced rubber, the required stiffness is readily supplied in the buttress, which is required to support to some extent the outer portion of the tire tread. The use of carbon black in the stocks of the tread-buttress junction permits the development of more satisfactory adhesion, and facilitates the compounding of the two stocks to essentially the same modulus, so that strains resulting from flexing of the tire will not be unduly concentrated in any one stock. It will be understood that if one stock were of appreciably lower modulus than the other, the strains would tend to concentrate in it, giving rise to undue deterioration at such area of concentration.

By bringing the termination of the colored sidewall stock up flush with the road-contacting surface of the tread in the manner described several advantages are made possible. In particular, by making the colored sidewall as thin as possible at such termination, there is no appreciable loss in tread wear, since virtually the entire tread surface is composed of the long-wearing carbon black reinforced stock. Also, since the colored sidewall is very thin at the edge of the tread, there is no undesirable tendency for such edge to wear unduly round. The method of assembly in which a preformed strip of the colored sidewall strip is placed at a definite locality on the previously prepared tread strip makes it possible to achieve a uniform circumferential junction, with no undue overlapping of the colored stock onto the surface of the black tread stock, and vice versa.

A modification of the invention which is capable of achieving certain of the aforementioned objects and advantages in a particularly desirable manner, and which is also capable of achieving certain additional advantages, contemplates disposing the upper marginal edge of the colored sidewall at a point on the side of the tread spaced somewhat below the edge of the road-contacting surface of the tread. In such modification, a principal zone of colored stock typically begins somewhere on the side of the outer or shoulder rib of the tread (sometimes called the buttress region), and extends downwardly to the commencement of a suitably placed white sidewall zone. The arrangement is particularly well suited to the use of light colors in the principal colored zone, and permits a darker colored stock or a black stock to be used at the marginal side area of the tread, over the zone extending between the upper edge of the light-colored zone and the lateral edge of the road-contacting portion of the tread. Such a black or dark colored zone has the advantage of avoiding a soiled appearance in this area of the sidewall, since the black or dark-colored stock does not show dirt as readily, and it is this zone of the sidewall in proximity to the edge of the tread that frequently tends to become soiled more easily than the remaining parts of the sidewall. The use, at the upper edge of the sidewall near the tread, of a zone of black stock makes it possible to effect in one respect a simplication, to the extent that in such case the tread may simply be compounded with ordinary staining compounding ingredients instead of requiring non-staining ingredients, although, of course, the tread can still be compounded of non-staining ingredients if desired. The following is an example of a suitable tread stock for use in this modified form of the invention:

Example 4

| | |
|---|---|
| GR–S 1500 | 100 |
| Carbon black | 48 |
| Stearic acid | 1 |
| Plasticizer (e. g. trade preparation known as "Paraflux") | 6 |
| Zinc oxide | 3 |
| Antioxidant (e. g. trade preparation known as "Flexamine") | 1 |
| Mercaptobenzothiazole | 0.6 |
| Diphenyl guanidine | 0.3 |
| Sulfur | 1.75 |
| | 161.65 |

A tire constructed in accordance with the foregoing modification may, as indicated in Fig. 5, typically include a black or dark-colored zone 40 overlying the side of the outermost or shoulder rib of the tread. As indicated in Fig. 6, such black or similar zone 40 may be formed as a cover strip which is applied so as to overlap the adjacent edge of the colored sidewall stock 41 when the parts are assembled with the carcass 42 of the tire on the usual tire building drum 43. The upper edge area 44 of the colored zone 41 is somewhat thickened where the black strip 40 overlaps the same. The colored portion 41 overlies a non-bleeding sidewall stock 45, as explained previously, and in the lower portion of the sidewall a white zone 46 is provided as usual.

As shown in Fig. 7, the mold 47 in which the shaped assembly is cured is provided with a recess 48 to produce in the molded tire a trim rib 49 (Fig. 8) in the area in which the black cover strip 40 terminates. This may be trimmed off along the line X—X in Fig. 8 to provide a sharp, even juncture line between the black portion 40 and the colored sidewall portion 41.

The arrangement shown is particularly advantageous from the standpoint of eliminating the necessity for using non-staining tread stock, since the colored portion 41 terminates short of the tread stock. The appearance of the tire is much enhanced by the black zone 40, and after a period of use such tire still presents a neat, clean appearance, because the area of the sidewall near the tread, which is most readily subject to soiling, is black and therefore does not show the dirt to an appreciable extent.

The cover strip 40 may also be formed of some color other than black, for example of a color darker than the main portion of the colored sidewall. For instance, if the main colored sidewall portion 41 were of light blue, the upper portion 40 nearer the tread might be of darker blue, thus presenting an attractive appearance. However, if the strip 40 is anything but a black strip, then a non-staining type stock would be used in the tread portion.

Having thus described my invention, what I claim and desire to protect by Letters Patent is:

1. A pneumatic tire comprising a central tread portion of carbon black reinforced stock substantially devoid of staining materials, a colored sidewall layer of non-uniform thickness having a portion beginning at an edge of said tread, said colored sidewall layer being thinnest at said edge and said colored sidewall layer being integrally united to the entire side surface of the said tread portion, said colored sidewall layer proceeding downwardly from said edge in a gradual smooth S-shaped curve to a point of termination located below the horizontal mid-plane of the tire cross section and gradually increasing in thickness so as to be thickest at said point of termination, and a white sidewall portion adjoining and extending downwardly from said colored sidewall layer.

2. A pneumatic tire comprising an underlying bead-equipped carcass of tire fabric rubberized with a carbon black reinforced non-staining rubber stock, a tread portion of carbon black reinforced non-staining rubber stock, a colored sidewall layer integrally united over the entire inner surface thereof to the exterior side surface of the tread portion, the sidewall layer having an upper edge coinciding with the edge of the tread and a lower edge intermediate said tread edge and the corresponding bead, said colored sidewall layer being thinnest at said upper edge, thickest at said lower edge, and increasing continuously and gradually in thickness from said upper edge to said lower edge.

3. A pneumatic tire comprising an underlying carcass of tire fabric rubberized with a carbon black reinforced non-staining rubber stock, an overlying tread of carbon black reinforced non-staining rubber stock, a lateral extension of said tread extending downwardly from the shoulder region of the tread also made of carbon black reinforced non-staining rubber stock and terminating at a point below the horizontal mid-plane of the tire cross section, the carbon black reinforced stock adjacent to and below the shoulder area of the tread serving to buttress such shoulder area, a veneer of colored stock overlying a side of the tread and the said lateral extension of the tread, the said colored veneer being integrally united over its entire inner surface to the side of the tread and to the outer surface of the said tread extension, the colored veneer being relatively thin at its upper edge and becoming gradually thicker toward its lower edge, the upper edge of the colored veneer coinciding with the edge of the tread, and the lower edge of the colored veneer being in proximity to the lower edge of the said lateral extension of the tread, and a white sidewall zone extending downwardly from the lower edges of the colored veneer and lateral extension of the tread, the thickened lower area of the colored veneer constituting the maximum cross-sectional width of the tire.

4. A pneumatic tire comprising an underlying carcass of tire fabric rubberized wtih a carbon black reinforced non-staining rubber stock, an overlying tread of carbon black reinforced non-staining GR–S rubber stock, an extension of said tread extending downwardly from the shoulder region of the tread also made of carbon black reinforced stock and terminating at a point below the horizontal mid-plane of the tire cross section, the carbon black reinforced stock in the area adjacent to and below the shoulder area of the tread serving to buttress such shoulder area, a veneer of colored stock overlying a side of the tread and the said lateral extension of the tread, the said colored veneer being comprised of rubber selected from the group consisting of polychloroprene rubber and mixtures of Hevea rubber with at least 40% of polychloroprene rubber, the upper edge of the colored veneer coinciding with the edge of the tread, and the lower edge of the colored veneer being in proximity to the lower edge of the said lateral extension of the tread, the thickness of said veneer being non-uniform and varying in a predetermined, gradual manner from a minimum at said upper edge thereof to a maximum at said lower edge thereof, and a white sidewall zone extending downwardly from the lower edges of the colored veneer and the lateral extension of the tread.

5. A pneumatic tire comprising a carbon black reinforced rubber tread made of staining stock, said tread terminating at a definite point in the buttress region of the tire, an under-sidewall layer of non-staining stock extending part way down the sidewall from said termination of the tread to a lower white sidewall zone, a zone of colored stock extending over the under-sidewall stock from the said termination of the tread to the white sidewall zone, and a layer of stock darker than said colored stock extending over the side of the tread from an edge of the road-contacting portion of the tread and overlapping the upper edge of said colored zone.

6. A method of making a pneumatic tire having substantially the appearance of a tire made of colored rubber comprising in combination the steps of providing a raw tire carcass, providing a preformed tread strip of carbon black reinforced rubber substantially devoid of staining materials, one side of said tread strip having formed integrally therewith a carbon black reinforced sidewall stock substantially devoid of staining materials, said black sidewall stock being thinner than the intended thickness of the sidewall portion of the tire, providing a preformed veneer strip of colored sidewall rubber stock, said preformed veneer strip being thinnest at one edge and gradually and continuously thickened to a maximum at its opposite edge, assembling said carcass, tread strip and colored veneer strip with said thinnest edge of the colored veneer strip disposed along an edge of the road-contacting portion of the tread, and with the inner surface of the veneer strip in adhesive contact with the side of the road-contacting portion of the tread and with the upper surface of said black sidewall stock, and with the thickest edge of the colored veneer strip corresponding to the lower termination of said black sidewall stock, superimposing a white sidewall strip on the carcass adjacent to the termination of the black sidewall portion and the colored veneer strip, shaping and curing the assembly in a toroidal mold, and thereafter buffing the entire outer surface of the colored veneer portion to impart a velvet texture thereto.

7. A method as in claim 6 in which the colored sidewall veneer strip is comprised of polychloroprene rubber.

8. A method of making a pneumatic tire having a colored sidewall zone comprising in combination the steps of providing a tire carcass, superimposing on said carcass a carbon black-reinforced tread stock and a carbon black-reinforced non-staining under-sidewall stock, the two said stocks being butted together at their respective edges along a definite circumferential line in the buttress region of the tire, superimposing a white sidewall stock over the carcass in the lower portion of the sidewall, superimposing a layer of colored rubber stock over the said non-staining under-sidewall stock, the colored stock extending from said white sidewall stock upwardly and terminating before reaching the said tread stock, thereafter applying a cover strip of stock darker than said colored sidewall stock extending from the edge of the road-contacting portion of the tread downwardly and overlapping the upper termination of the said colored sidewall stock, and subsequently shaping and curing the resulting assembly.

References Cited in the file of this patent

UNITED STATES PATENTS

| | | |
|---|---|---|
| 2,334,388 | Daniel | Nov. 16, 1943 |
| 2,560,195 | Smith et al. | July 10, 1951 |
| 2,572,259 | Gottschall | Oct. 23, 1951 |
| 2,649,134 | Steinle | Aug. 18, 1953 |
| 2,685,904 | Brandau | Aug. 10, 1954 |